United States Patent
Haugen

(10) Patent No.: US 10,814,924 B2
(45) Date of Patent: Oct. 27, 2020

(54) EXCAVATOR TRACK TENSIONING

(71) Applicant: Clark Equipment Company, West Fargo, ND (US)

(72) Inventor: Jacob Haugen, Mandan, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 408 days.

(21) Appl. No.: 15/471,639

(22) Filed: Mar. 28, 2017

(65) Prior Publication Data

US 2017/0274947 A1  Sep. 28, 2017

Related U.S. Application Data

(60) Provisional application No. 62/314,164, filed on Mar. 28, 2016.

(51) Int. Cl.
*B62D 55/30* (2006.01)
*E02F 9/22* (2006.01)
(Continued)

(52) U.S. Cl.
CPC .......... *B62D 55/305* (2013.01); *B62D 55/06* (2013.01); *B62D 55/30* (2013.01); *E02F 3/32* (2013.01);
(Continued)

(58) Field of Classification Search
CPC ... E02F 9/121; E02F 9/123; E02F 9/22; E02F 9/2296; E02F 9/2267; E02F 9/2253;
(Continued)

(56) References Cited

U.S. PATENT DOCUMENTS 3,310,127 A    3/1967 Erwin-Walter Siber et al.
3,910,649 A   10/1975 Roskaft
(Continued)

FOREIGN PATENT DOCUMENTS

CN    202264833 U    6/2012
CN    203412008 U    1/2014
(Continued)

OTHER PUBLICATIONS

International Search Report and Written Opinion for International Application No. PCT/US2017/024520 filed Mar. 28, 2017, 12 pages.
(Continued)

*Primary Examiner* — Anne Marie M Boehler
(74) *Attorney, Agent, or Firm* — John Veldhuis-Kroeze; Westman, Champlin & Koehler, P.A.

(57) ABSTRACT

Power machines, power sources for power machines, and methods which provide a hydraulic signal from a hydraulic system, through the swivel joint or swivel, to control a tensioning cylinder coupled to the undercarriage without requiring a modification to the swivel. In exemplary embodiments, the same hydraulic signal provided to at least one other hydraulic component on the undercarriage to control another machine function is also provided to control one or more tensioning cylinders. For example, exemplary disclosed embodiments provide the same hydraulic signal to tension a tensioning cylinder as is provided to shift one or more two-speed drive motors. This prevents or reduces the likelihood of de-tracking without requiring a change or redesign of the swivel.

10 Claims, 7 Drawing Sheets

(51) Int. Cl.
*E02F 9/12* (2006.01)
*E02F 9/02* (2006.01)
*E02F 9/00* (2006.01)
*B62D 55/06* (2006.01)
*E02F 3/32* (2006.01)
*E02F 9/26* (2006.01)

(52) U.S. Cl.
CPC ............... *E02F 9/006* (2013.01); *E02F 9/02* (2013.01); *E02F 9/121* (2013.01); *E02F 9/22* (2013.01); *E02F 9/225* (2013.01); *E02F 9/2253* (2013.01); *E02F 9/2267* (2013.01); *E02F 9/2296* (2013.01); *E02F 9/265* (2013.01)

(58) Field of Classification Search
CPC ...... B62D 55/06; B62D 55/305; B62D 55/30; B62D 51/007
See application file for complete search history.

(56) References Cited

U.S. PATENT DOCUMENTS

| | | | |
|---|---|---|---|
| 3,972,569 A | 8/1976 | Bricknell | |
| 4,545,624 A | 10/1985 | Van Ooyen | |
| 4,893,883 A * | 1/1990 | Satzler | B62D 55/30 180/9.1 |
| 5,316,381 A | 5/1994 | Isaacson et al. | |
| 5,984,436 A | 11/1999 | Hall | |
| 6,249,994 B1 | 6/2001 | Oertley | |
| 6,276,768 B1 | 8/2001 | Miller | |
| 6,408,965 B1 | 6/2002 | Grant | |
| 6,948,783 B2 | 9/2005 | Hoff | |
| 8,371,402 B2 | 2/2013 | Allaire | |
| 8,469,124 B2 | 6/2013 | Allaire | |
| 8,640,797 B2 | 2/2014 | Allaire | |
| 2003/0117017 A1* | 6/2003 | Hoff | B62D 55/30 305/143 |
| 2003/0122422 A1 | 7/2003 | Hoff et al. | |
| 2014/0070604 A1 | 3/2014 | De Palma | |
| 2014/0144716 A1 | 5/2014 | Wirkus et al. | |
| 2015/0129329 A1 | 5/2015 | Cox | |

FOREIGN PATENT DOCUMENTS

| | | |
|---|---|---|
| CN | 103572788 A | 2/2014 |
| CN | 204098112 U | 1/2015 |
| EP | 1760326 A2 | 3/2007 |
| JP | H0465689 U | 6/1998 |

OTHER PUBLICATIONS

First Office Action, including Search Report, for Chinese Patent Application No. 201780020256.0, dated Aug. 14, 2020, 15 pages.

* cited by examiner

EXCAVATOR TRACK TENSIONING

CROSS-REFERENCE TO RELATED APPLICATION

This application claims the benefit of U.S. Provisional Application No. 62/314,164, which was filed on Mar. 28, 2016.

BACKGROUND

This disclosure is directed toward power machines. More particularly, this disclosure is directed to track tensioning in power machines, such as excavators, having a hydraulic system positioned in an upper machine portion or house that pivots with respect to an undercarriage about a swivel joint.

Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include excavators, loaders, utility vehicles, tractors, and trenchers, to name a few examples.

Many power machines have variable displacement (often known as "two-speed") drive motors with two different displacement settings: a first setting known as a low range and a second setting known as a high range. In the so-called low range, the drive motor has a relatively higher displacement (as compared to the high range). This higher displacement provides a relatively higher torque output from the drive motor, but a lower travel speed (hence the name, "low range"). Conversely, in the so-called high range, the drive motor has a lower displacement, thereby reducing the torque output, but allowing for a higher travel speed (hence the name, "high range"). Many of these types of two-speed drive motors are shifted between low and high range by introducing a hydraulic signal to a shifting element in the motor. Tracked excavators have endless tracks that rotate about track frames to propel the machine. These track frames are attached to an undercarriage of the excavator, with the hydraulic system included in the upper machine portion or house of the excavator. The upper machine portion of the excavator pivots with respect to the undercarriage about a vertical axis on a swivel joint or swivel, which allows for unlimited rotational movement of the upper machine portion in either direction relative to the undercarriage.

In tracked excavators, a tensioning member holds the track to a preferred tension. In some machines, the tensioning member is a grease cylinder that is tensioned independently of the hydraulic system of the machine. While applying pressure to the tensioning member using the hydraulic system of the upper machine portion could be advantageous in some designs, doing so would necessitate providing one or more paths through the swivel joint. While passing hydraulic signals through a swivel joint is known, passing additional signals through the swivel joint requires a change to the swivel and additional complexity. It is preferable to limit the number of hydraulic signals that are passed through a swivel joint.

The discussion above is merely provided for general background information and is not intended to be used as an aid in determining the scope of the claimed subject matter.

SUMMARY

Disclosed embodiments include power machines, power sources for power machines, and methods which provide a hydraulic signal from a hydraulic system, through the swivel joint or swivel, to control a tensioning cylinder coupled to the undercarriage without requiring a modification to the swivel. In exemplary embodiments, the same hydraulic signal provided to at least one other hydraulic component on the undercarriage to control another machine function is also provided to control one or more tensioning cylinders. For example, exemplary disclosed embodiments provide the same hydraulic signal to tension a tensioning cylinder as is provided to shift one or more two-speed drive motors. This prevents or reduces the risk of de-tracking without requiring a change or redesign of the swivel, avoiding unneeded complexity.

In some exemplary embodiments, a power machine is provided having an undercarriage portion supported by at least one track assembly having an endless track. A tensioning cylinder is coupled to the undercarriage portion and is configured to tension the endless track. A first hydraulic component coupled to the undercarriage portion is configured to control a first power machine function, such as shifting one or more variable displacement drive motors between a first displacement and a second displacement. An upper machine portion is attached to the undercarriage portion by a swivel and is configured to rotate about a vertical axis of the swivel relative to the undercarriage. A hydraulic source coupled to the upper machine portion is operatively coupled hydraulically through the swivel to the first hydraulic component to control the first power machine function and to an input to the tensioning cylinder to pressurize or tension the tensioning cylinder. A control circuit is configured to selectively provide hydraulic fluid from the hydraulic source to the first hydraulic component and to the input to the tensioning cylinder.

In some exemplary embodiments, a power source for a tensioning cylinder is provided. The power source in these embodiments includes a hydraulic source configured to control a displacement of a variable displacement drive motor. The hydraulic source is selectively provided as an input to the tensioning cylinder and as an input to a shift mechanism of the drive motor. A control circuit of the power source is configured to selectively provide the hydraulic source to the tensioning cylinder and the shift mechanism of the drive motor responsively to a speed input being indicative of high range drive motor operation. In these or other embodiments, the control circuit can be configured to also selectively provide the hydraulic source to the tensioning cylinder and the shift mechanism of the drive motor responsively to an operator input device being in a neutral position.

In some exemplary embodiments, a power source for a tensioning cylinder includes a hydraulic source, operatively coupled through a swivel, to a first hydraulic component to control a first function of the power machine and to an input to the tensioning cylinder. A control circuit of the power source is configured to selectively provide the hydraulic source to the first hydraulic component and to the input to the tensioning cylinder.

In some embodiments, a method of providing hydraulic fluid to a tensioning cylinder includes coupling an input of a first hydraulic component of the power machine to an input of the tensioning cylinder. The hydraulic source is operatively coupled, through a swivel, to the input of the first hydraulic component of the power machine to control a first function of the power machine and to control pressure in the tensioning cylinder. A control circuit is controlled to selectively provide hydraulic fluid from the hydraulic source to the input of the first hydraulic component and thereby also to the input of the tensioning cylinder.

This Summary and the Abstract are provided to introduce a selection of concepts in a simplified form that are further described below in the Detailed Description. This Summary is not intended to identify key features or essential features of the claimed subject matter.

DETAILED DESCRIPTION

Figure 1:
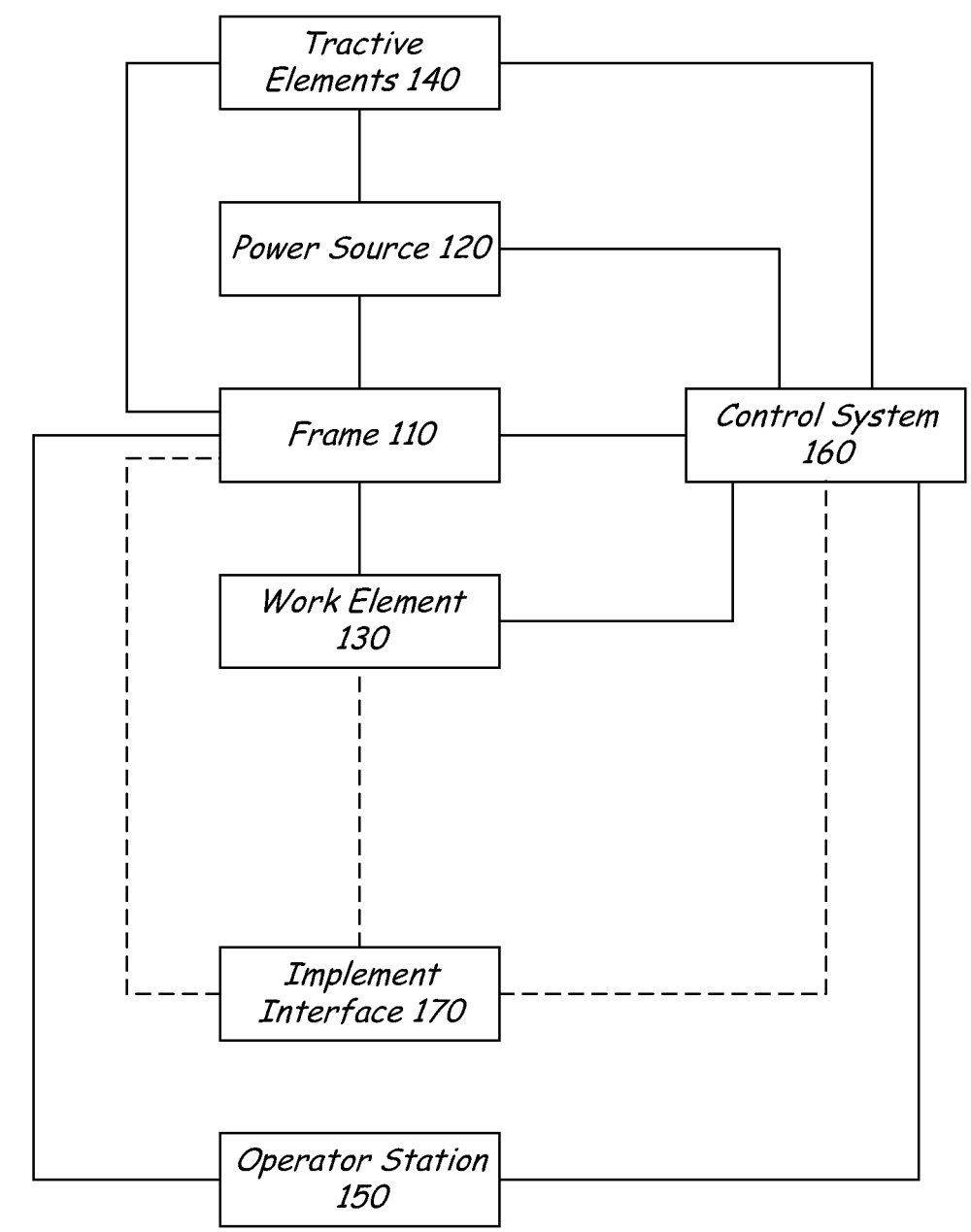
FIG. 1 is a block diagram illustrating functional systems of a representative power machine on which embodiments of the present disclosure can be practiced.

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed embodiments address the issue of providing a hydraulic signal from a power machine's hydraulic system, for example in an excavator, through the swivel joint or swivel, to control a tensioning cylinder without requiring a modification to the swivel. In exemplary embodiments, the same hydraulic signal provided to at least one other hydraulic component on the undercarriage of the power machine to control another machine function is also provided to control one or more tensioning cylinders. For example, exemplary disclosed embodiments provide the same hydraulic signal to tension the tensioning cylinders as is provided to shift one or more two-speed motors. This prevents or reduces the risk of de-tracking without requiring a change or redesign of the swivel, saving cost and complexity.

A two-speed circuit is typically designed to selectively provide a pressurized hydraulic signal to one or more drive motors to change the displacement of the drive motor(s). For example, the pressurized signal can be provided to a shift mechanism of a drive motor to a high range to reduce the displacement of the drive motor(s), which will increase the top speed of the motor while also reducing its torque output. Thus, any time the drive motor is in the high range, a pressure signal is also available for the tensioning cylinders. However, when the one or more drive motors are in a low range (i.e., the displacement of the drive motors are increased as compared to the high range, resulting in lower top speeds, but increased torque), the pressure signal would not be available to the tensioning cylinders. To maintain pressurization of the tensioning cylinders, in some disclosed embodiments, the pressure signal can be provided to the tensioning cylinders in various conditions when the drive motors are supposed to be in low range by shifting the drive motors to high range in circumstances which do not cause the power machine to unintentionally operate or be driven in the high range, even for a short period of time, so that there is no noticeable jolt in the drive function.

In exemplary embodiments, the pressure can be replenished at the tensioning cylinders by applying the pressurized shift signal to the drive motor to shift to high range when the power machine is commanded to operate in the low range, but is not being driven. In some exemplary embodiments, pressure can be replenished at the tensioning cylinders by momentarily shifting from low range to high range when the operator is changing travel directions so that operator inputs pass through a neutral position in either direction. If the power machine is not traveling (e.g., user inputs are in a neutral position), or if user inputs pass through neutral, then pressure can be replenished in the tensioning cylinder by switching travel motors momentarily to the high range mode.

Figure 2:
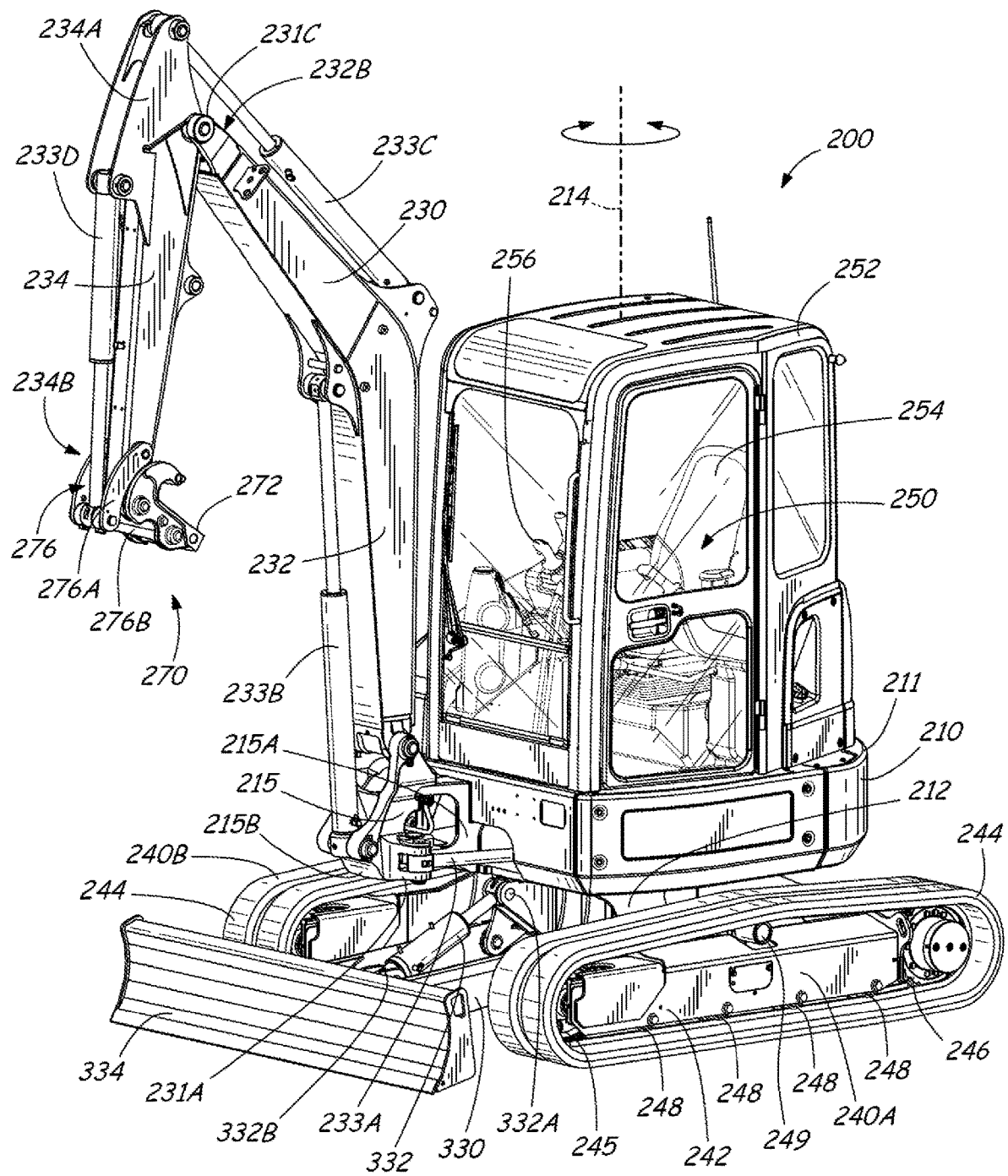
FIG. 2 is a front left perspective view of a representative power machine in the form of an excavator on which the disclosed embodiments can be practiced.
Figure 3:
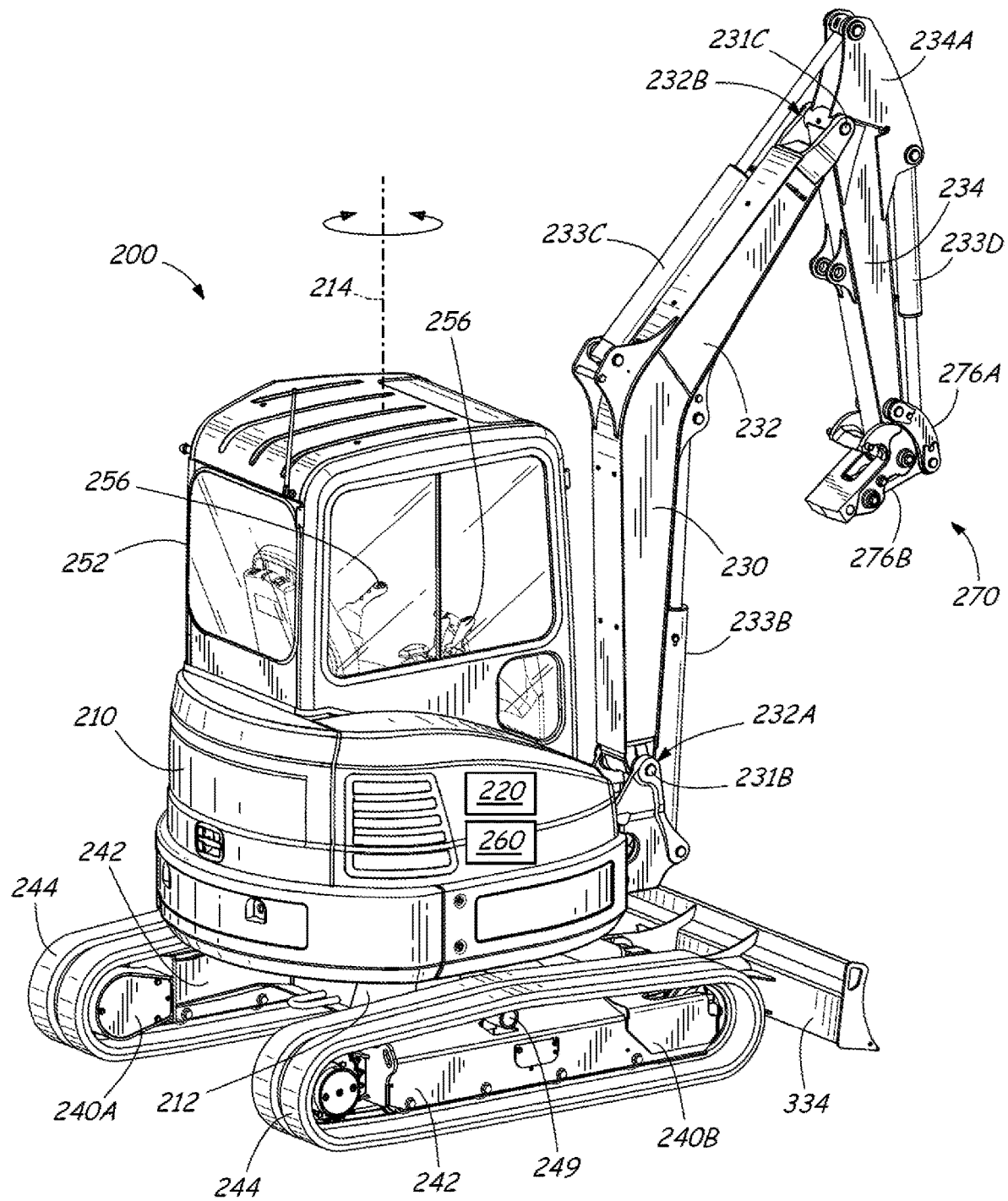
FIG. 3 is a rear right perspective view of the excavator of FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is discussed. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Referring now to FIG. 1, a block diagram illustrates the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates about a swivel with respect to a lower frame portion. Other work vehicles have articulated frames such that one portion of the frame pivots with respect to another portion for accomplishing steering functions. In exemplary embodiments, at least a portion of the power source is located in the upper frame or machine portion that rotates relative to the lower frame portion or undercarriage. The power source provides power to components of the undercarriage portion through the swivel.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, wheels attached to an axle, track assemblies, and the like. Tractive elements can be rigidly mounted to the frame such that movement of the tractive element is limited to rotation about an axle or steerably mounted to the frame to accomplish steering by pivoting the tractive element with respect to the frame.

Power machine 100 includes an operator station 150, which provides a position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote control device can be provided (i.e. remote from both of the power machine and any implement to which is it coupled) that is capable of controlling at least some of the operator controlled functions on the power machine.

FIGS. 2-3 illustrate an excavator 200, which is one particular example of a power machine of the type illustrated in FIG. 1, on which the disclosed embodiments can be employed. Unless specifically noted otherwise, embodiments disclosed below can be practiced on a variety of power machines, with the excavator 200 being only one of those power machines. Excavator 200 is described below for illustrative purposes. Not every excavator or power machine on which the illustrative embodiments can be practiced need have all of the features or be limited to the features that excavator 200 has. Excavator 200 has a frame 210 that supports and encloses a power system 220 (represented in FIGS. 2-3 as a block, as the actual power system is enclosed within the frame 210). The power system 220 includes an engine that provides a power output to a hydraulic system. The hydraulic system acts as a power conversion system that includes one or more hydraulic pumps for selectively providing pressurized hydraulic fluid to actuators that are operably coupled to work elements in response to signals provided by operator input devices. The hydraulic system also includes a control valve system that selectively provides pressurized hydraulic fluid to actuators in response to signals provided by operator input devices. The excavator 200 includes a plurality of work elements in the form of a first lift arm structure 230 and a second lift arm structure 330 (not all excavators have a second lift arm structure). In addition, excavator 200, being a work vehicle, includes a pair of tractive elements in the form of left and right track assemblies 240A and 240B, which are disposed on opposing sides of the frame 210.

An operator compartment 250 is defined in part by a cab 252, which is mounted on the frame 210. The cab 252 shown on excavator 200 is an enclosed structure, but other operator compartments need not be enclosed. For example, some excavators have a canopy that provides a roof but is not enclosed A control system, shown as block 260 is provided for controlling the various work elements. Control system 260 includes operator input devices, which interact with the power system 220 to selectively provide power signals to actuators to control work functions on the excavator 200.

Frame 210 includes an upper frame portion or house 211 that is pivotally mounted on a lower frame portion or undercarriage 212 via a swivel joint. The swivel joint includes a bearing, a ring gear, and a slew motor with a pinion gear (not pictured) that engages the ring gear to swivel the machine. The slew motor receives a power signal from the control system 260 to rotate the house 211 with respect to the undercarriage 212. House 211 is capable of unlimited rotation about a swivel axis 214 under power with respect to the undercarriage 212 in response to manipulation of an input device by an operator. Hydraulic conduits are fed through the swivel joint via a hydraulic swivel to provide pressurized hydraulic fluid to the tractive elements and one or more work elements such as lift arm 330 that are operably coupled to the undercarriage 212.

The first lift arm structure 230 is mounted to the house 211 via a swing mount 215. (Some excavators do not have a swing mount of the type described here.) The first lift arm structure 230 is a boom-arm lift arm of the type that is generally employed on excavators although certain features of this lift arm structure may be unique to the lift arm illustrated in FIGS. 2-3. The swing mount 215 includes a frame portion 215A and a lift arm portion 215B that is rotationally mounted to the frame portion 215A at a mounting frame pivot 231A. A swing actuator 233A is coupled to the house 211 and the lift arm portion 215B of the mount. Actuation of the swing actuator 233A causes the lift arm structure 230 to pivot or swing about an axis that extends longitudinally through the mounting frame pivot 231A.

The first lift arm structure 230 includes a first portion 232, known generally as a boom, and a second portion 234, known as an arm or a dipper. The boom 232 is pivotally attached on a first end 232A to mount 215 at boom pivot mount 231B. A boom actuator 233B is attached to the mount 215 and the boom 232. Actuation of the boom actuator 233B causes the boom 232 to pivot about the boom pivot mount 231B, which effectively causes a second end 232B of the boom to be raised and lowered with respect to the house 211. A first end 234A of the arm 234 is pivotally attached to the second end 232B of the boom 232 at an arm mount pivot 231C. An arm actuator 233C is attached to the boom 232 and the arm 234. Actuation of the arm actuator 233C causes the arm to pivot about the arm mount pivot 231C. Each of the swing actuator 233A, the boom actuator 233B, and the arm actuator 233C can be independently controlled in response to control signals from operator input devices.

An exemplary implement interface 270 is provided at a second end 234B of the arm 234. The implement interface 270 includes an implement carrier 272 that is capable of accepting and securing a variety of different implements to the lift arm 230. Such implements have a machine interface that is configured to be engaged with the implement carrier 272. The implement carrier 272 is pivotally mounted to the second end 234B of the arm 234. An implement carrier actuator 233D is operably coupled to the arm 234 and a linkage assembly 276. The linkage assembly includes a first link 276A and a second link 276B. The first link 276A is pivotally mounted to the arm 234 and the implement carrier actuator 233D. The second link 276B is pivotally mounted to the implement carrier 272 and the first link 276A. The linkage assembly 276 is provided to allow the implement carrier 272 to pivot about the arm 234 when the implement carrier actuator 233D is actuated.

The implement interface 270 also includes an implement power source (not shown in FIGS. 2-3) available for connection to an implement on the lift arm structure 230. The implement power source includes pressurized hydraulic fluid port to which an implement can be coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The electrical power source can also include electrical conduits that are in communication with a data bus on the excavator 200 to allow communication between a controller on an implement and electronic devices on the excavator 200. It should be noted that the specific implement power source on excavator 200 does not include an electrical power source.

The lower frame 212 supports and has attached to it a pair of tractive elements 240, identified in FIGS. 2-3 as left track drive assembly 240A and right track drive assembly 240B. Each of the tractive elements 240 has a track frame 242 that is coupled to the lower frame 212. The track frame 242 supports and is surrounded by an endless track 244, which rotates under power to propel the excavator 200 over a support surface. Various elements are coupled to or otherwise supported by the track 242 for engaging and supporting the track 244 and cause it to rotate about the track frame. For example, a sprocket 246 is supported by the track frame 242 and engages the endless track 244 to cause the endless track to rotate about the track frame. An idler 245 is held against the track 244 by a tensioner (not shown) to maintain proper tension on the track. The track frame 242 also supports a plurality of rollers 248, which engage the track and, through the track, the support surface to support and distribute the weight of the excavator 200. An upper track guide 249 is provided for providing tension on track 244 and preventing the track from rubbing on track frame 242.

A second, or lower, lift arm 330 is pivotally attached to the lower frame 212. A lower lift arm actuator 332 is pivotally coupled to the lower frame 212 at a first end 332A and to the lower lift arm 330 at a second end 332B. The lower lift arm 330 is configured to carry a lower implement 334. The lower implement 334 can be rigidly fixed to the lower lift arm 330 such that it is integral to the lift arm. Alternatively, the lower implement can be pivotally attached to the lower lift arm via an implement interface, which in some embodiments can include an implement carrier of the type described above. Lower lift arms with implement interfaces can accept and secure various different types of implements thereto. Actuation of the lower lift arm actuator 332, in response to operator input, causes the lower lift arm 330 to pivot with respect to the lower frame 212, thereby raising and lowering the lower implement 334.

Upper frame portion 211 supports cab 252, which defines, at least in part, operator compartment or station 250. A seat 254 is provided within cab 252 in which an operator can be seated while operating the excavator. While sitting in the seat 254, an operator will have access to a plurality of operator input devices 256 that the operator can manipulate to control various work functions, such as manipulating the lift arm 230, the lower lift arm 330, the traction system 240, pivoting the house 211, the tractive elements 240, and so forth.

Excavator 200 provides a variety of different operator input devices 256 to control various functions. For example, hydraulic joysticks are provided to control the lift arm 230, and swiveling of the house 211 of the excavator. Foot pedals with attached levers are provided for controlling travel and lift arm swing. Electrical switches are located on the joysticks for controlling the providing of power to an implement attached to the implement carrier 272. Other types of operator inputs that can be used in excavator 200 and other excavators and power machines include, but are not limited to, switches, buttons, knobs, levers, variable sliders and the like. The specific control examples provided above are exemplary in nature and not intended to describe the input devices for all excavators and what they control.

Display devices are provided in the cab to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

The description of power machine 100 and excavator 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on an excavator such as excavator 200, unless otherwise noted, the concepts discussed below are not intended to be limited in their application to the environments specifically described above.

As discussed above, disclosed embodiments provide for improved track tensioning and reduced risk of de-tracking in a power machine having a swivel joint, without requiring additional hydraulic signals to be passed through the swivel joint. This is accomplished by providing the same hydraulic signal to pressurize the tensioning cylinders as is provided to another hydraulic component on the undercarriage of the power machine to control another machine function. For example, exemplary disclosed embodiments provide the same hydraulic signal to tension the tensioning cylinders as is provided to shift at least one two-speed motor. This prevents or reduces the risk of de-tracking without requiring a change or redesign of the swivel, saving cost and reducing complexity.

Figure 4:
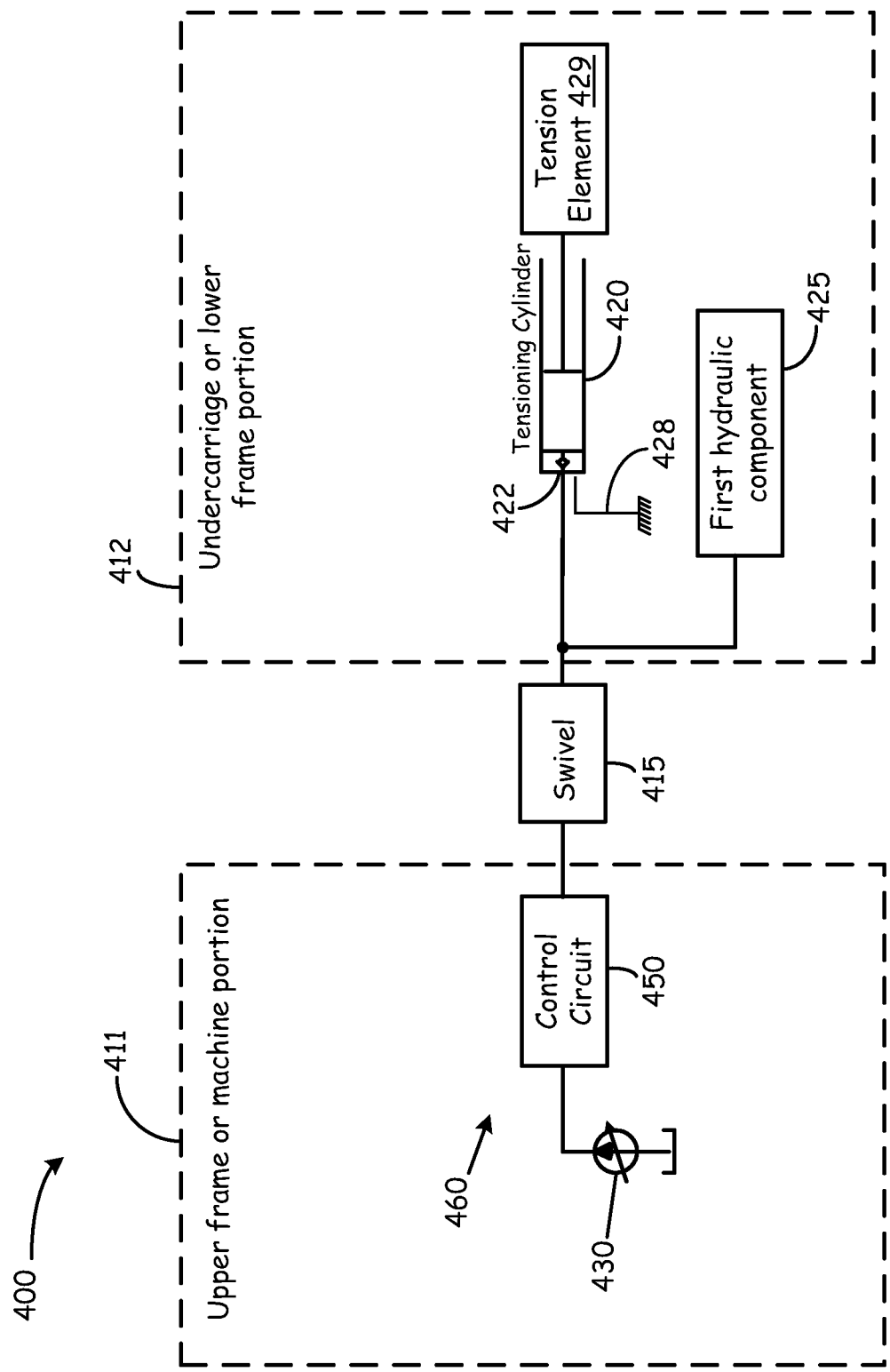
FIG. 4 is a block diagram illustrating a power machine in accordance with exemplary embodiments.

Referring now to FIG. 4, illustrated is a simplified block diagram of a power machine 400 upon which the illustrative embodiments discussed herein can be practiced. Power machine 400 is generally similar to the power machines 100 and 200 described above. As such, power machine 400 can include any of the various features and components described above with reference to power machines 100 and 200, though not all components are shown in FIG. 4 in order to simplify the illustration of certain features Like power machine 200, in exemplary embodiments, power machine 400 is an excavator or other type of power machine in which an upper frame or machine portion 411 is rotatably coupled about a vertical axis (e.g., vertical axis 214 discussed above with reference to FIGS. 2 and 3) to an undercarriage or lower frame portion 412 by a swivel 415.

Although not shown, undercarriage portion 412 is supported by at least one track assembly, such as track assemblies 240 discussed above with reference to FIGS. 2 and 3, having an endless track such as endless track 244 also discussed above. A tensioning cylinder 420 is coupled to the undercarriage portion 412 and is configured to tension the endless track. One end of the tensioning cylinder 420 is coupled to a track frame 428 and the other end is coupled to a tensioning member 429 such as an idler. Extension of the tensioning cylinder 420 causes the tensioning member 429 to move against the endless track. While each endless track can have a separate tensioning cylinder, only one tensioning cylinder is shown to simplify the illustration of disclosed concepts. A first hydraulic component 425 is operably coupled to the undercarriage portion 412 and is configured to control a first power machine function. In some embodiments, the first power machine function is a shift function of a drive motor of the power machine used to control operation of the drive motor between a low range and a high range. However, other power machine components and functions located on the undercarriage portion of power machine 400 can be the first hydraulic function in other embodiments.

Upper frame or machine portion 411 includes a hydraulic source 430, which illustratively includes one or more hydraulic pumps. In various embodiments, hydraulic source 430 can include multiple hydraulic pumps connected in parallel, one or more hydraulic pumps connected through one or more valve configurations, or in other arrangements. The hydraulic source 430 is coupled to the upper machine portion 411 and moves with the upper machine portion 411 relative to the undercarriage 412. As such, the hydraulic source is operatively coupled through the swivel 415 to the first hydraulic component 425 to provide pressurized hydraulic fluid to the first hydraulic component to control the first power machine function, and also to an input 422 of the tensioning cylinder 420 to provide pressurized hydraulic fluid for increasing or maintain pressure within the tensioning cylinder. A control circuit 450 is included to selectively provide hydraulic fluid from the hydraulic source 430 to the first hydraulic component 425 and to the input 422 to the tensioning cylinder 420. Control circuit 450 includes various components, such as one or more valves, electrical and/or electronic control members, and valve actuators to selectively provide hydraulic fluid from the hydraulic source under conditions described below. Hydraulic source 430 and control circuit 450 collectively form a power source 460 for tensioning cylinder 420, thereby providing control of tensioning of the endless track of the power machine.

Figure 5:
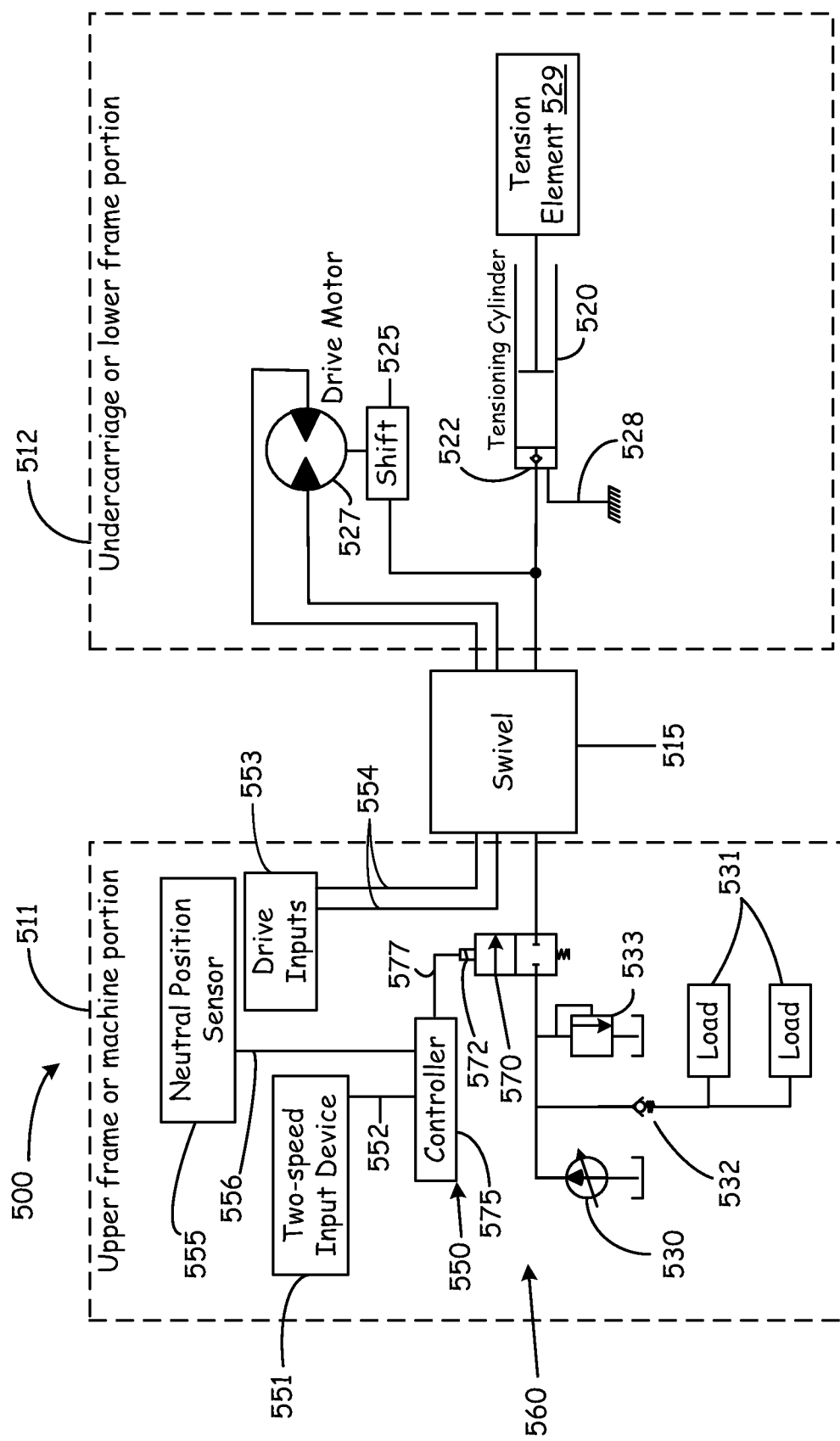
FIG. 5 is a block diagram illustrating another embodiment of the power machine shown in FIG. 4.

Referring now to FIG. 5, shown is power machine 500 which is one more particular embodiment of power machine 400 shown in FIG. 4. Similarly numbered components of power machine 500 can be the same as those described above with reference to power machine 400. Like power machine 400, power machine 500 includes an upper frame or machine portion 511 attached to an undercarriage or lower frame portion 512 by a swivel 515 such that the upper machine portion is configured to rotate about a vertical axis (e.g., vertical axis 214 discussed above with reference to FIGS. 2 and 3) of the swivel relative to the undercarriage. Power machine 500 similarly includes a power source 560 having a hydraulic source 530 and a control circuit 550 which selectively provide hydraulic fluid from the hydraulic source 530 to both a first hydraulic component and to the input 522 to the tensioning cylinder 520. However, in power machine 500 shown in FIG. 5, the first hydraulic component is specifically shown to be a shift mechanism 525 for changing the displacement of a drive motor 527 that is used to drive the endless tracks to propel the power machine over a surface. The shift mechanism 525, which can for example be mechanism to move a swash plate or other hydraulically controlled mechanisms to vary the displacement of the drive motor 527 between, for example, first and second displacements. While only one tensioning cylinder is shown, power machine 500 can include two or more tensioning cylinders, for example one for each track assembly, each of which can be operably coupled to the input signal that is also provided to the shift mechanism 525. Power machine 500 can include separate drive motors 527 for the two or more endless tracks, and separate shift mechanisms 525 for each, with each of the separate shift mechanisms being coupled to the same input signal that is provided to the one or more tensioning cylinders 520.

In some exemplary embodiments, control circuit 550 includes a valve 570 downstream of the hydraulic source 530 and configured to control the provision of hydraulic fluid through swivel 515 to tensioning cylinder 520 and shift mechanism 525. Other hydraulic components coupled to the undercarriage portion 512, such as drive motor 527, can receive hydraulic fluid through swivel 515 on lines or hydraulic paths which are independent from control circuit 550. Such lines or hydraulic paths, and corresponding components, are not shown in FIG. 5 for simplicity's sake. In some embodiments, valve 570 can be a two-position valve which either provides hydraulic fluid from hydraulic source 530 to tensioning cylinder 520 (to tension the cylinder) and shift mechanism 525 (to shift the drive motor), or prevents hydraulic fluid from being provided to these components. A position of valve 570 can be controlled, for example, using a solenoid 572 or other valve actuator to selectively couple the hydraulic source 530 to the input 522 to the tensioning cylinder 520 and to the shift mechanism 525.

In some exemplary embodiments, hydraulic source 530 of power source 560 and control circuit 550 are isolated from high pressure loads 531 on the power machine by a check valve 532 or other isolating components coupled to the output of hydraulic source 530. For example, loads 531 can be lift arm actuator loads, drive motor loads, etc. Thus, high pressure in the hydraulic system from loads 531 does not affect the shift function or the function of tensioning the track tensioning cylinder. A pressure regulator 533 in the form of a pressure relief valve (or alternatively a pressure reducing valve) is coupled to the output of the hydraulic source 530 and the input of valve 570 to set the pressure supplied to the valve 570 to a predetermined amount that is advantageous for operation of the hydraulic circuit.

In some embodiments, a controller 575, such as a suitably configured electronic controller, is operatively coupled to the valve 570 and is configured to provide a control signal 577 to the valve actuator 572 to control a valve position, and thereby control the selective coupling of the hydraulic source 530 to the input 522 to the tensioning cylinder 520 and the shift mechanism 525. The controller 575 receives one or more inputs and is configured to provide the control signal responsive to the one or more inputs.

As illustrated in FIG. 5, in some exemplary embodiments, power machine 500 also includes an operator input device 551, which provides a motor displacement input signal 552 to controller 575 that is indicative of an operator's manipulation of the operator input device 551 for controlling a travel speed range of the power machine, which is accomplished by controlling the displacement of the drive motor 527. Operator input device 551 can be referred to as a two-speed switch or input device, as it is provided to allow an operator to select between a low range and a high range of operation of the one or more drive motors on the machine. Controller 575 generates control signal 577 as a function of, or in response to, motor displacement input signal 552. In this exemplary embodiment, the control circuit 550 is configured to selectively provide pressurized hydraulic fluid from the hydraulic source 530 to the input 522 of the tensioning cylinder 520 and to the shift mechanism 525 of the drive motor 527 in response to which of the two speeds the motor displacement input signal 552 indicates. In some exemplary embodiments, the controller 575 is configured to generate the control signal 577 to control the two-speed valve 570 to provide the hydraulic fluid under pressure from the hydraulic source, to the input of the tensioning cylinder and the shift mechanism, when the motor displacement input signal 552 places the drive motor 527 in a high range. A neutral position sensor 555 provides a signal 556 to the controller 575 indicative of the position of one or more drive control input devices 553. The one or more drive control input devices 553 are manipulable by an operator to control operation of the drive motor 527 by supplying hydraulic signals 554 to the drive motor 527 through the swivel 515. The illustration of the drive control inputs and signals are greatly simplified (i.e. it does not illustrate hydraulic valves and pumps of the type that are normally employed in excavators or other power machines). The neutral position sensor 555 indicates whether or not the drive control input devices 553 are being manipulated.

In power machines such as excavators, a two-speed circuit is typically designed to selectively provide the pressurized hydraulic signal to the drive motor 527 to change the displacement of the drive motor. In exemplary embodiments, a pressurized hydraulic signal from hydraulic source 530 is provided to shift mechanism 525 when the displacement of drive motor 527 is to be reduced to place the motor in low displacement arrangement, which will allow the excavator to travel at a higher speed. Thus, any time the drive motor 527 is in the low displacement arrangement, a pressure hydraulic signal is available for tensioning the tensioning cylinder 520.

However, in some embodiments or in some modes of operation, when it is desirable for the drive motor 527 to be in the higher displacement condition, the pressure signal from hydraulic source 530 is not provided to the tensioning cylinder 520 for maintaining tensioning pressure (i.e., it is the absence of the pressurized hydraulic signal that causes the drive motor to shift to the higher displacement condition). In this condition, no affirmative hydraulic signal is provided to maintain pressure on the tensioning cylinder. Typically, a check valve or other hydraulic components can be used to prevent unintended loss of pressure in a tensioning cylinder, thereby providing a tensioning signal vis-à-vis the pressurized fluid that is captured within the tensioning cylinder. However, some minor leakage may occur, which can slightly reduce the tensioning pressure. In the disclosed embodiments, the power source 560 is configured to provide hydraulic fluid under pressure from hydraulic source 530 to the tensioning cylinder 520 in various conditions when the drive motor 527 is otherwise intended to be in the higher displacement condition. This is accomplished, for example, by supplying the pressurized hydraulic signal to shift to high range without causing the machine to unintentionally move. Periodically providing a pressurized hydraulic signal to the tensioning cylinder 520 compensates for any leakage that may occur and will maintain an advantageous level of tension on the tensioning element.

One way that the pressure can be replenished at tensioning cylinder 520 without unintentionally operating power machine 500 in the lower displacement condition is to apply the pressurized shift signal to shift mechanism 525 and tensioning cylinder 520 when the power machine is commanded by the operator to be in the higher displacement mode, but while the power machine is not being driven (i.e. when no hydraulic signal is being provided to operate the drive motor 527). In some exemplary embodiments, two-speed input device 551 can be controlled by an operator to selectively place the drive motor in either displacement. Controller 575 is configured, in some embodiments, to control the two-speed valve 570 to provide the hydraulic source 530 to the input of the tensioning cylinder, and thus to the shift mechanism, even when the motor displacement input signal 552 does not signal an intention to place the drive motor in the high range, if the drive inputs 553 are in a neutral position or passes through the neutral position as sensed by neutral position sensor 555.

Figure 6:
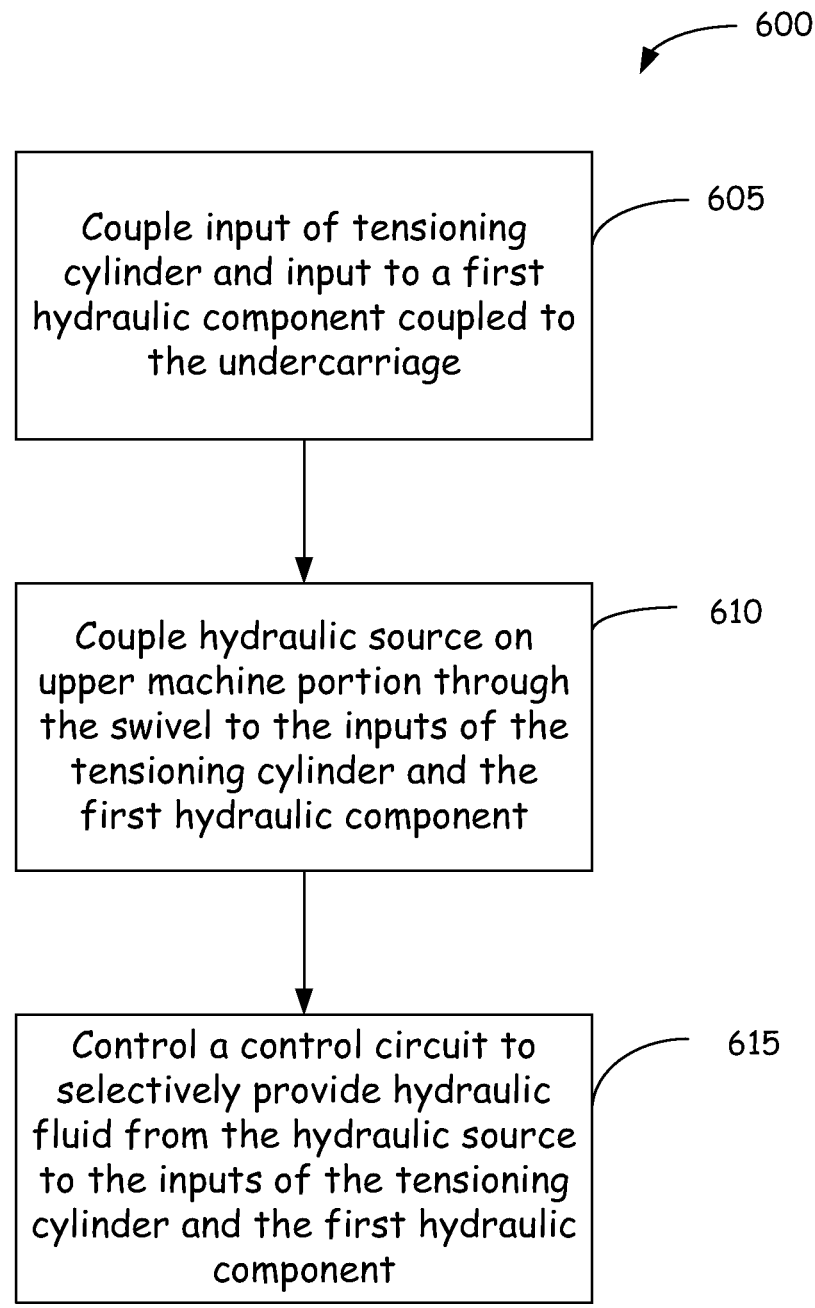
FIG. 6 is a flow diagram illustrating an exemplary method of providing hydraulic fluid to a tensioning cylinder.
Figure 7:
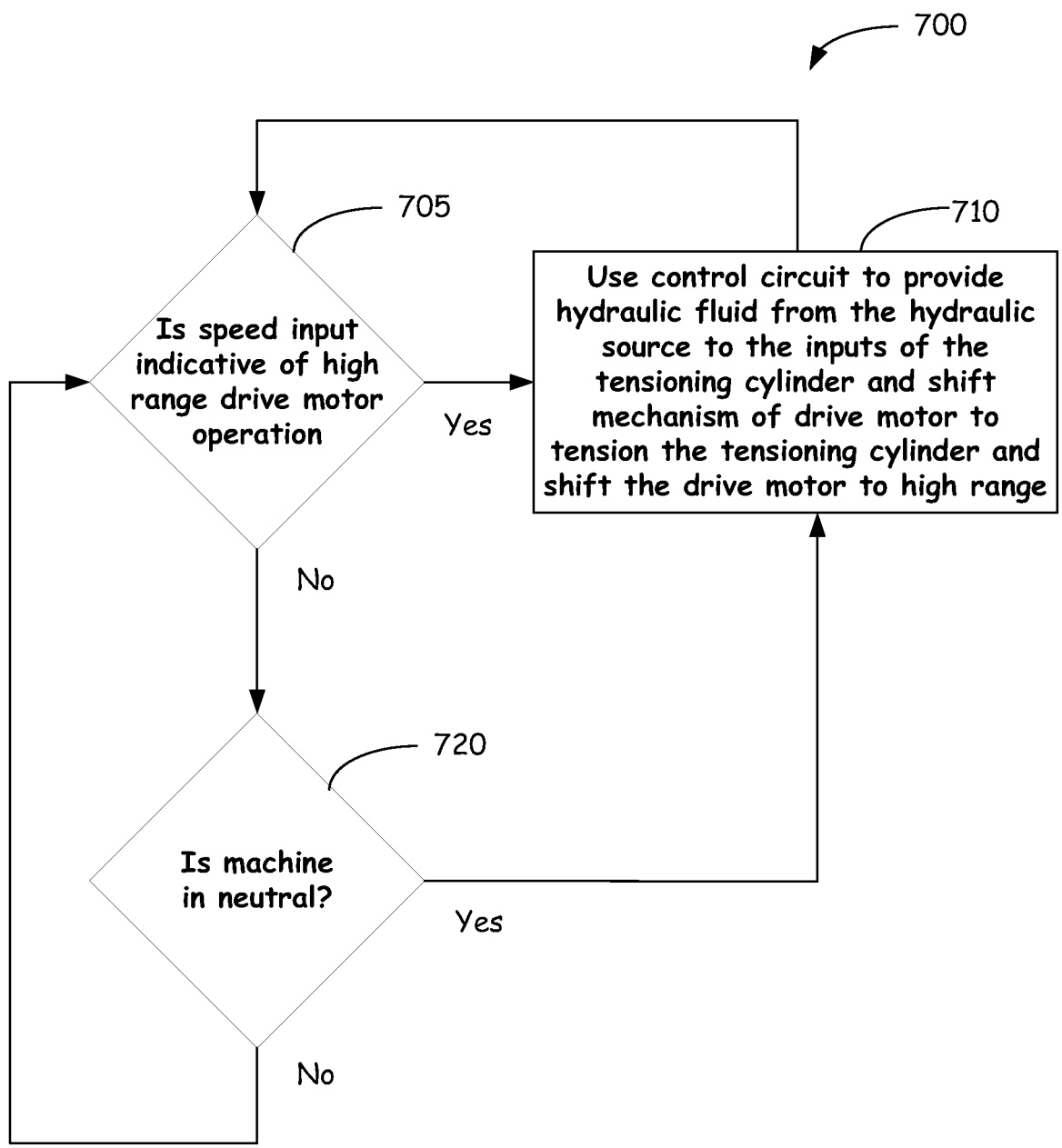
FIG. 7 is a flow diagram illustration of embodiments of a method of controlling a control circuit to selectively provide hydraulic fluid to a tensioning cylinder.

Referring now to FIG. 6, shown in a flow diagram is a method 600 of providing hydraulic fluid to a tensioning cylinder, such as tensioning cylinders 420 and 520, to tension an endless track in accordance with some exemplary embodiments including those discussed above. The method includes at 605 coupling an input of a first hydraulic component of the power machine, such as first hydraulic component 425 shown in FIG. 4 or shift mechanism 525 shown in FIG. 5, to an input of the tensioning cylinder. At 610, the method includes operatively coupling a hydraulic source, such as hydraulic sources 430 and 530, through a swivel to the input of the first hydraulic component to control a first function of the power machine and to the input of the tensioning cylinder to tension the cylinder. At 615, the method includes controlling a control circuit, such as control circuits 450 and 550 discussed above, to selectively provide hydraulic fluid from the hydraulic source to the inputs of the first hydraulic component and the tensioning cylinder. FIG. 7 illustrates methods 700 of controlling the control circuit using the techniques discussed above, for example by suitably configuring controller 575.

In method 700, it is determined at block 705 whether the motor displacement input signal 522 is indicative of the power machine being operated in or commanded to operate in the high range of the drive motor. Any time that it is determined from the motor displacement input signal 522 that the power machine is operating in the high range, at block 710 the control circuit is controlled or used to provide hydraulic fluid from the hydraulic source to the inputs of the tensioning cylinder and the shift mechanism of the drive motor. Thus, the tensioning cylinder is tensioned while the drive motor is shifted to, or maintained in, the high range.

If it is determined that the motor displacement input signal 522 is not indicative of high range drive motor operation or a command to do so, at block 720 the method determines whether the power machine is in neutral. If it is determined that the power machine is in neutral, even temporarily as the drive inputs 553 travels from a forward travel position to a reverse travel position or vice versa, again at block 710 the control circuit is controlled or used to provide hydraulic fluid from the hydraulic source to the inputs of the tensioning cylinder and the shift mechanism of the drive motor. This provides yet another opportunity to shift the drive motor into the high range at a time and in a manner that is not readily perceptible to the operator of the power machine, allowing the tensioning cylinder to be pressurized without causing undesirable changes to the operator's driving experience. It must be noted that the decisions at blocks 705, 710 and 720 of method 700 need not all be present in all embodiments. Furthermore, in various embodiments, these decisions need not be made in a particular order. When any of these or other predetermined conditions are present, the control circuit can be controlled to provide a pressure signal to shift the drive motor, thereby also tensioning the tensioning cylinder, without causing a perceptible jerking of the power machine due to shifting of the drive motor.

Although the present invention has been described with reference to preferred embodiments, workers skilled in the art will recognize that changes may be made in form and detail without departing from the scope of the discussion.

What is claimed is:

1. A method of providing tension to an endless track on an excavator, comprising:
   selectively providing a hydraulic signal to shift a displacement of a drive motor mounted to an undercarriage of the excavator; and
   diverting a portion of the hydraulic signal to a tensioning cylinder that is operably coupled to a track frame and a tensioning member in contact with the endless track to tension the endless track.

2. The method of claim 1, wherein diverting the portion of the hydraulic signal to the tensioning cylinder to tension the endless track further comprises providing a diverted portion of the hydraulic signal directly to the tensioning cylinder without the use of a control valve.

3. The method of claim 1 and further comprising:
   receiving an indication from a user input of an intent to provide the hydraulic signal; and
   providing the hydraulic signal in response to receiving the indication.

4. The method of claim 1 and further comprising:
sensing whether the excavator is moving; and
providing the hydraulic signal in response to a determination that the excavator is not moving.

5. The method of claim 1 and further comprising:
receiving a signal from a user input of whether the user has an intent to provide the hydraulic signal;
sensing whether the excavator is moving;
providing the hydraulic signal when the received signals an intent to provide the hydraulic signal and when sensing that the excavator is not moving.

6. A method of providing tension to an endless track on an excavator, comprising:
selectively providing a hydraulic signal to a shift mechanism, on an undercarriage of the excavator, to change displacement of a drive motor; and
diverting a portion of the hydraulic signal from the shift mechanism to a tensioning cylinder to tension the endless track.

7. The method of claim 6, wherein selective providing the hydraulic signal includes providing the hydraulic signal from a hydraulic source on an upper portion of the excavator through a pivoting joint between the upper portion to the undercarriage.

8. The method of claim 6, wherein selectively providing the hydraulic signal to the shift mechanism to change displacement of the drive motor comprises selectively providing the hydraulic signal to the shift mechanism the change the displacement of the drive motor between a lower displacement mode and a higher displacement mode.

9. The method of claim 6, wherein selectively providing the hydraulic signal to the shift mechanism to change the displacement of the drive motor further comprises selectively providing the hydraulic signal to the shift mechanism to move a swash plate to change the displacement of the drive motor.

10. The method of claim 6, wherein diverting the portion of the hydraulic signal from the shift mechanism to the tensioning cylinder to tension the endless track further comprises providing a diverted portion of the hydraulic signal directly to the tensioning cylinder without the use of a control valve.

* * * * *